United States Patent

[11] 3,633,225

[72] Inventors Francis J. Burst;
James S. Adams, both of Batesville, Ind.
[21] Appl. No. 12,806
[22] Filed Feb. 19, 1970
[45] Patented Jan. 11, 1972
[73] Assignee Hill-Rom Company Inc.
Batesville, Ind.

[54] DOUBLE INSULATED ELECTRIC HOSPITAL BED
4 Claims, 27 Drawing Figs.
[52] U.S. Cl.................................................. 5/63,
5/68, 137/5 R, 137/138 D, 310/43
[51] Int. Cl....................................................... A61g 7/00,
H01b 3/00
[50] Field of Search....................................... 5/66–69;
174/138.2, 5; 310/40 MM, 43, 50; 248/18, 19, 22,
54, 74

[56] References Cited
UNITED STATES PATENTS
2,911,246 11/1959 Canuso.......................... 174/138.2

| 2,988,758 | 6/1961 | Donaldson .................. | 5/68 |
| 3,034,830 | 5/1962 | Auedon........................ | 297/DIG. 2 |
| 3,054,643 | 9/1962 | Militano....................... | 297/DIG. 2 |
| 3,198,891 | 8/1965 | Burst et al.................... | 5/68 X |
| 3,237,212 | 3/1966 | Hillenbrand et al. ......... | 5/68 |
| 3,242,998 | 3/1966 | Gubbins ....................... | 310/50 X |
| 3,344,291 | 9/1967 | Pratt............................. | 310/43 X |
| 3,414,913 | 12/1968 | Stanley et al. ................ | 5/68 |
| 3,487,134 | 12/1969 | Burr ............................. | 264/45 |

Primary Examiner—Casmir A. Nunberg
Attorneys—George H. Simmons and Robert V. Jambor ABSTRACT: This application discloses an electric hospital bed in which the motor and electric switches are insulated from the casing of the motor in the usual manner and in which the motor casing and electrical connections thereto are insulated from the frame of the bed to prevent damaging electric shocks from the motor thereof reaching a patient in the bed, even though an improperly grounded commercial electric circuit is encountered.

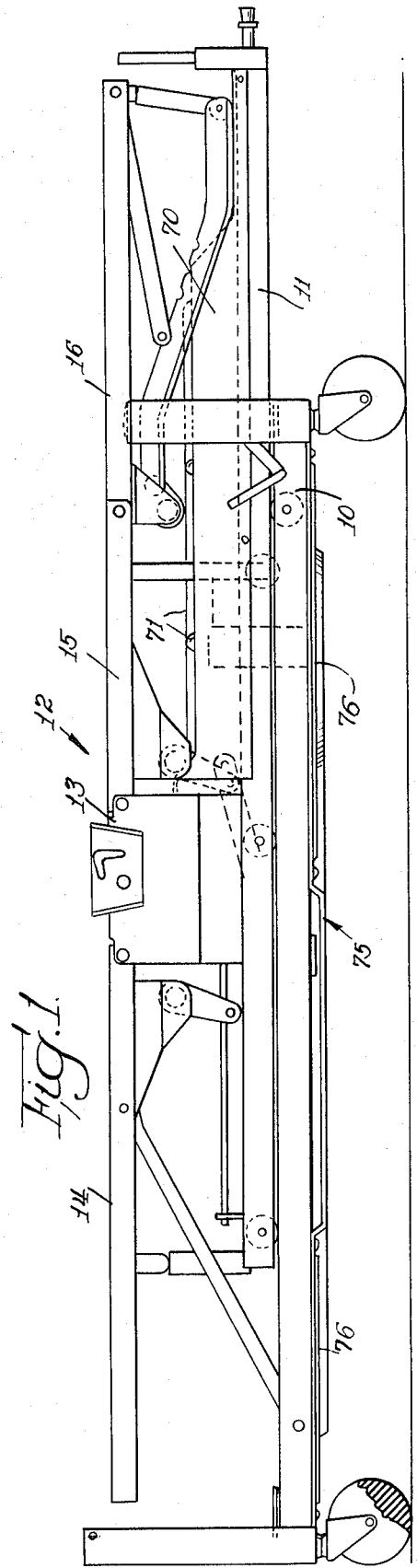
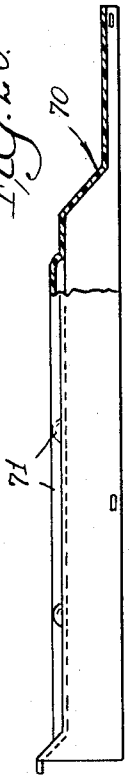
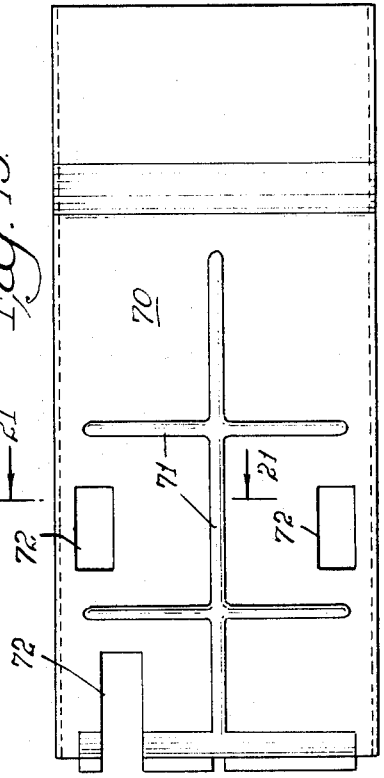
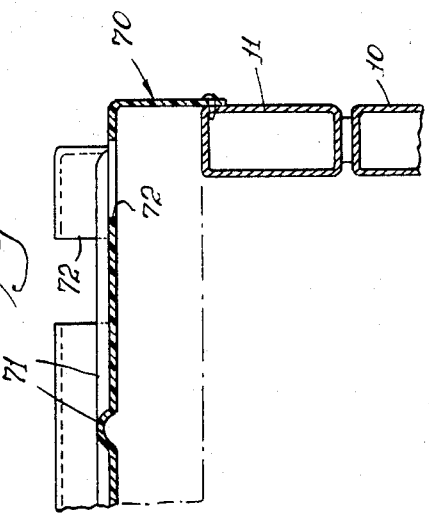
Inventors
Francis J. Burst and
James S. Adams
By George H. Simmons
Att'y.

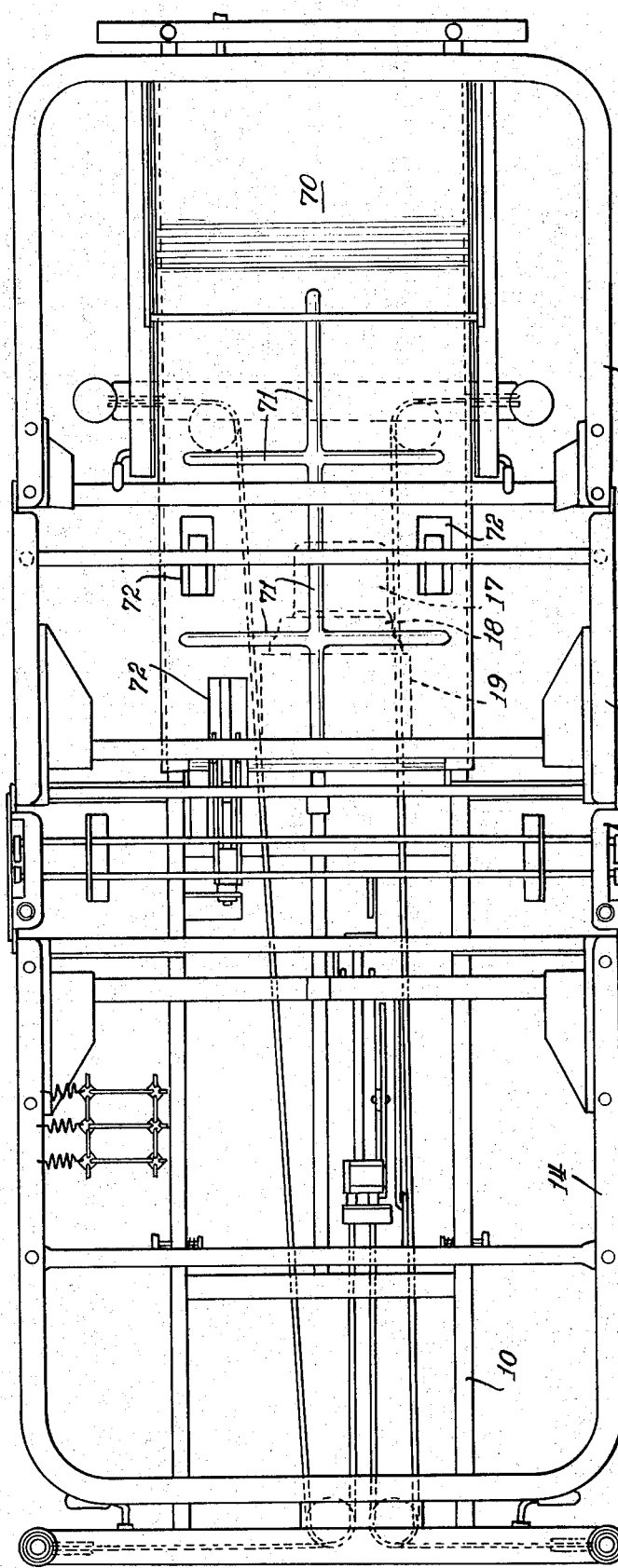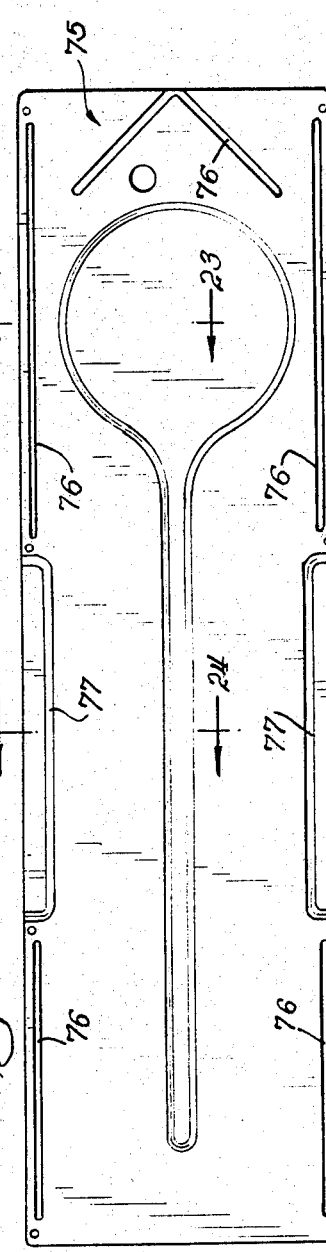

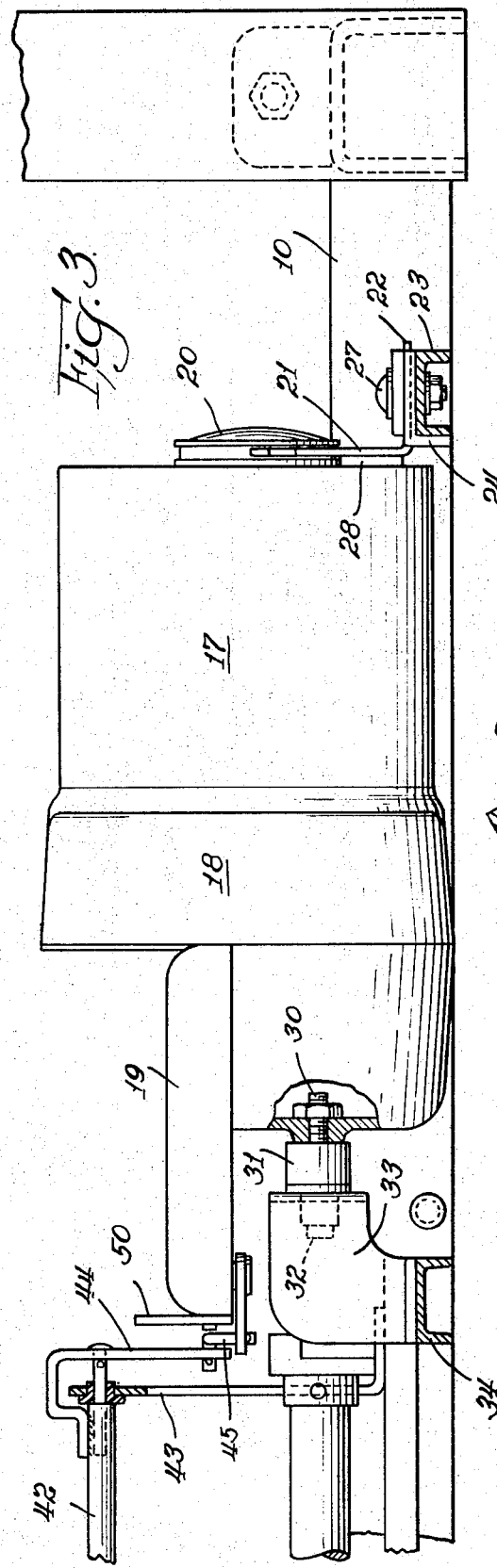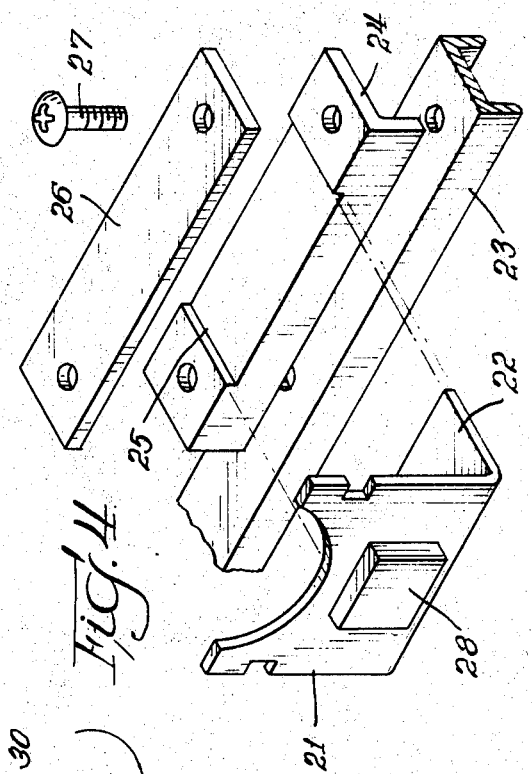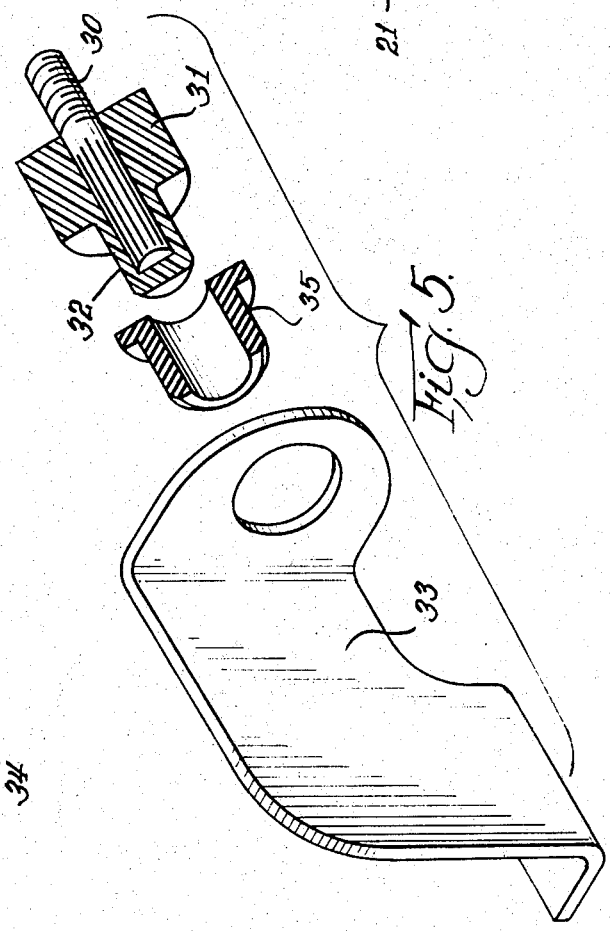

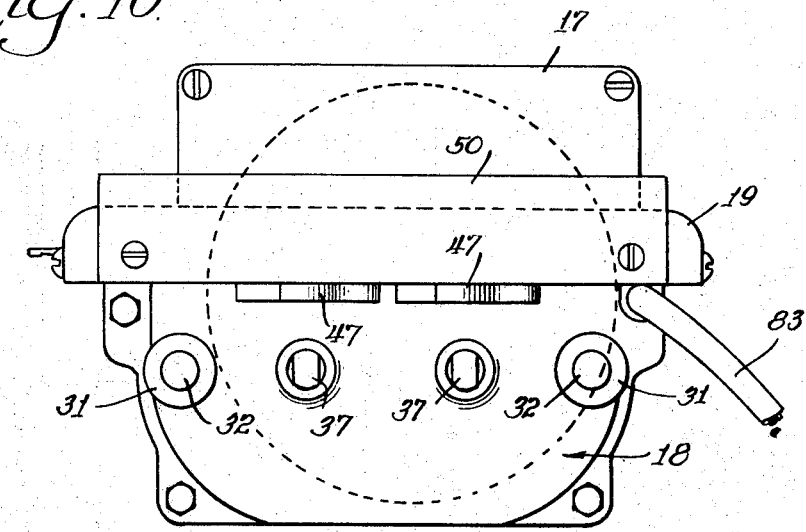
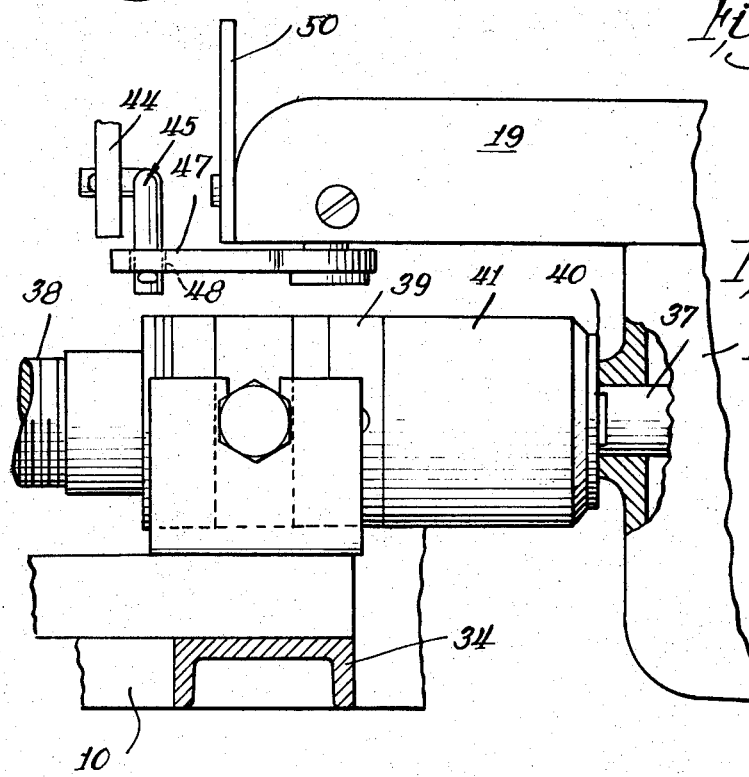
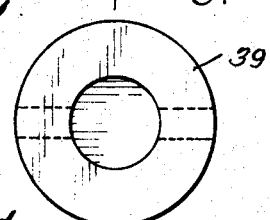
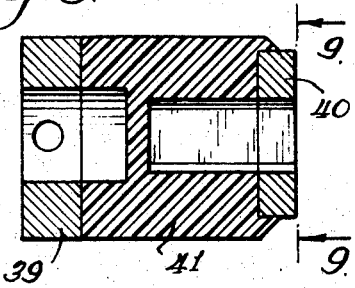
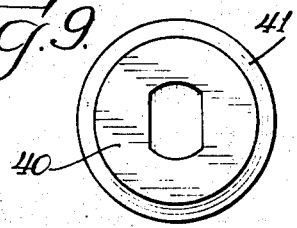

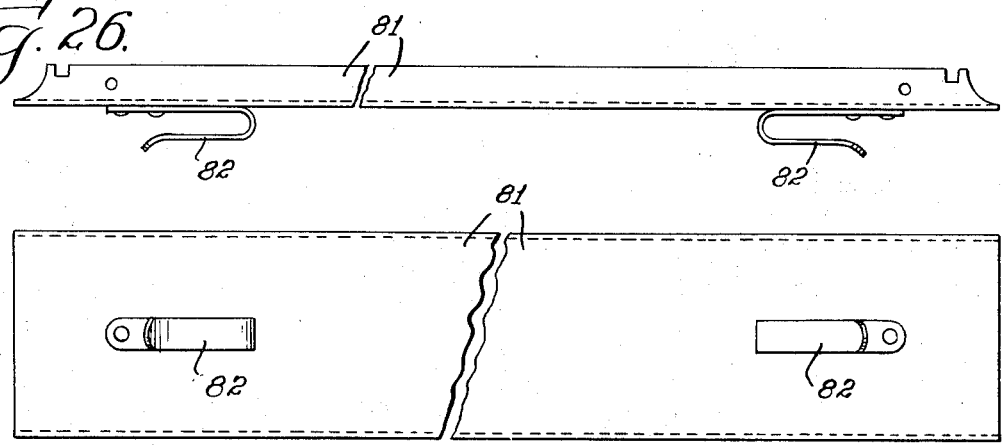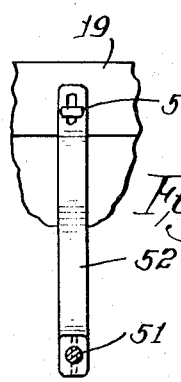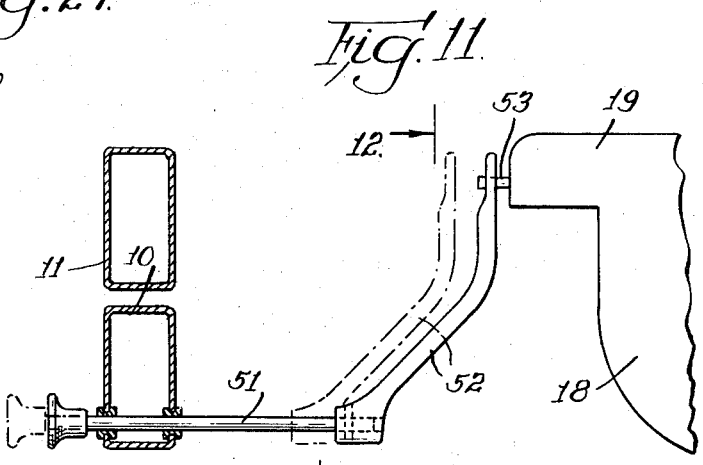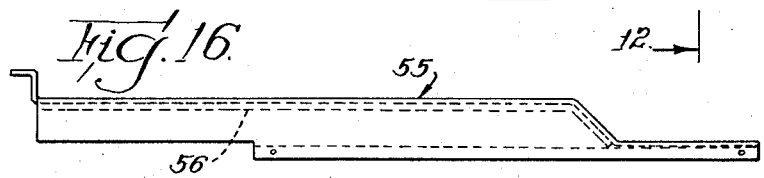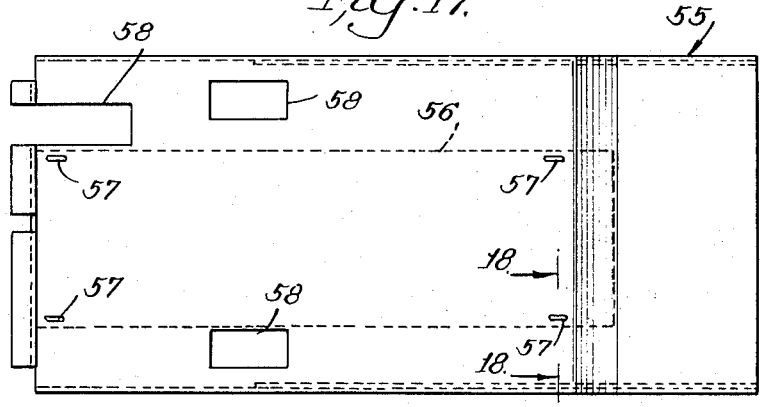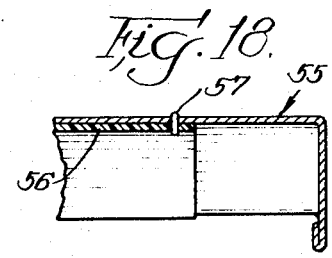

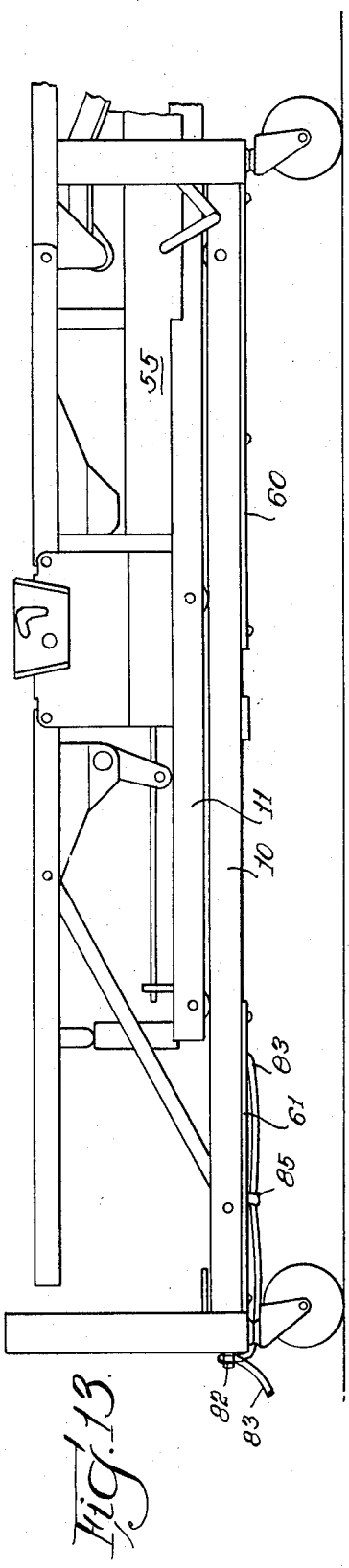
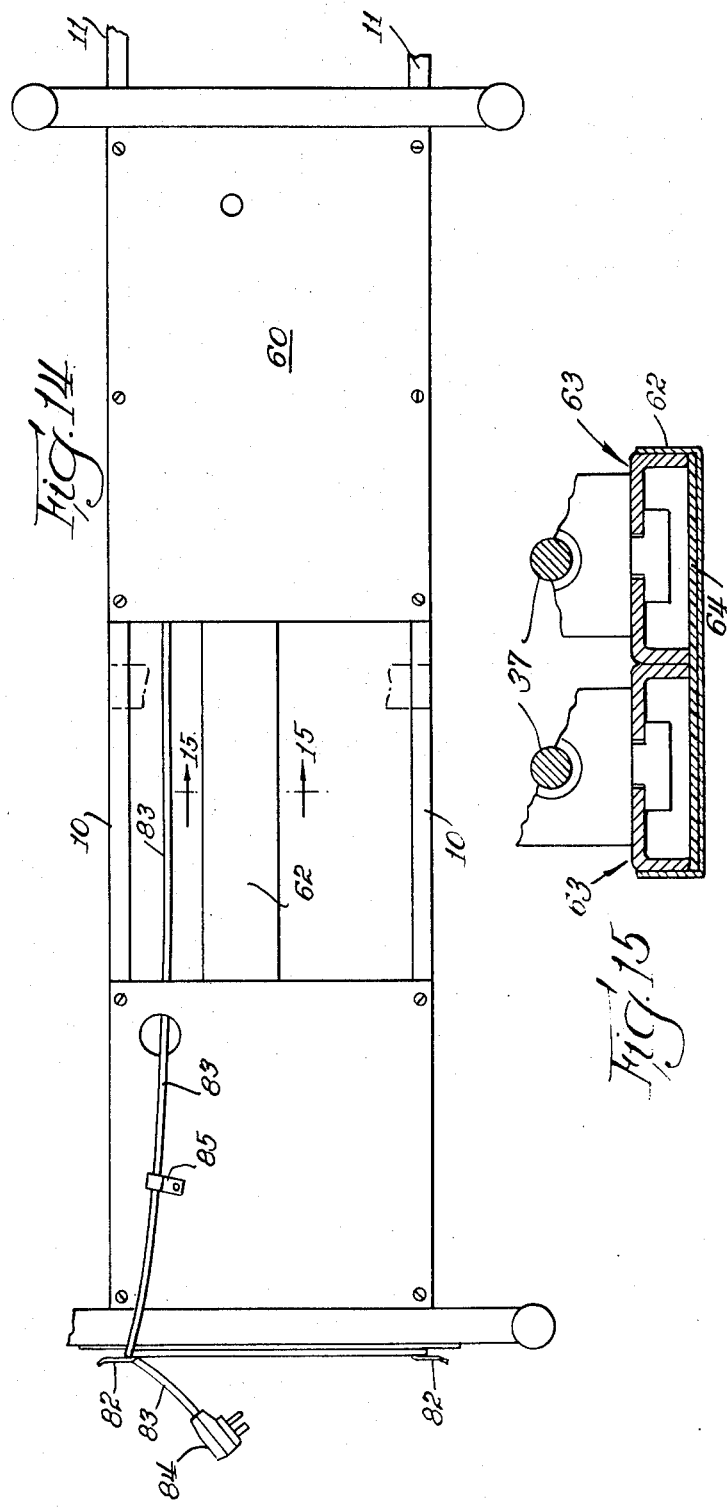

DOUBLE INSULATED ELECTRIC HOSPITAL BED

BACKGROUND OF THE INVENTION

Electrocution of patients in electric hospital beds has received much publicity in the publications of recent date. The Electronic News of Jan. 27th 1969 and the National Enquirer of Jan. 26th 1969 both report that an estimated 1,200 patients are killed each year in electric beds in hospitals in the United States. While none of these articles cite any authority for the number of 1,200, none of them definitely deny that this number id accurate and none of them has offered a lower figure in substitution therefore.

The National Enquirer further reports that of 500 electric beds surveyed nearly one-third were ungrounded. This article further states that a patient in an ungrounded bed coming into contact with an uninsulated side guard may receive a shock sufficiently high to be fatal. Shocks as low as 20 microamperes are said to be sufficient to electrocute a patient under certain conditions. The article in the Jan. 27, 1969 Electronic News states that some electronic equipment furnished to hospitals has excessive leakage current due to faulty circuit design and the like and when such equipment is connected to a patient an electrocution can result should the patient touch something that is connected to ground.

These published facts have caused much concern to hospital staff and administrators and have been discussed in many seminars held from time to time. The gist of these discussions is to make sure that all electric hospital beds are properly grounded, preferably through a three wire plug registered in a three prong socket the ground terminal of which is connected to a ground that is common to all of the outlets in the patient area.

The present invention seeks to reduce the possibility of electrocution of a patient by first properly grounding the motor casing and apparatus connected thereto and then insulating the thus grounded equipment from the bedframe through the use of high dielectric strength material with the result that the maximum possible leakage from the grounded apparatus to the bedframe is of the order of not more than one microampere. Through this arrangement the danger of electrocuting a patient is minimized, if not entirely eliminated, even under the most dangerous circumstances such as in the cardiac ward of the hospital.

It has been found that electrical cords such as are used to connect an electric hospital bed to a source of commercial current may have leakage as high as one microampere per foot of cord. Due to this fact the frame of a bed is further insulated so that the cord is prevented from coming into contact with the metal framework of the bed so that any leakage that may exist is not conducted to the frame of the bed and thereby does not constitute a hazard to the patient in the bed.

BRIEF DESCRIPTION OF THE DRAWINGS

FIG. 1 is an elevational view of an electric bed to which the teachings of the present invention are applied;

FIG. 2 is a plan view of the bed shown in FIG. 1;

FIG. 3 is a fragmentary elevational view, partly in section, drawn to an enlarged scale, and showing the motor and mounting thereof;

FIG. 4 is an exploded view showing particularly the mounting of the motor casing upon the lower frame of the bed;

FIG. 5 is an exploded view showing the mounting of the gearbox upon the lower frame of the bed;

FIG. 6 is an elevational view drawn to an enlarged scale and showing the coupling between an output shaft of the gearbox and a drive screw of the bed;

FIG. 7 is an end view of drive screw collar;

FIG. 8 is a cross-sectional view of the coupling shown in FIG. 6;

FIG. 9 is an end view of a power output collar;

FIG. 10 is an end elevational view of the motor unit taken from the gearbox end thereof;

FIG. 11 is a fragmentary elevational view partly in cross section showing the lockout forks for connecting a lock out rod on the bed frame to a lockout lever in the control unit;

FIG. 12 is an elevational view partly in cross section along the line 12—12 of FIG. 11.

FIG. 13 is a said elevation view, similar to FIG. 1, with a preferred form of insulated covers attached thereto;

FIG. 14 is a bottom side plan view of the bed shown in FIG. 13;

FIG. 15 is a fragmentary cross-sectional view along the line 15—15 of FIG. 14 looking in the direction of the arrows and drawn to an enlarged scale;

FIG. 16 is a side elevational view of the top cover of the bed shown in FIG. 13;

FIG. 17 is plan view of the cover shown in FIG. 16;

FIG. 18 is a fragmentary cross-sectional view taken along the line 18—18 of FIG. 17 looking in the direction of the arrows;

FIG. 19 is a plan view of the motor cover of the bed shown in FIG. 1;

FIG. 20 is an elevational view of the cover shown in FIG. 19 partly in cross section;

FIG. 21 is a cross-sectional view along the line 21—21 of FIG. 19;

FIG. 22 is a plane view of the bottom cover of the bed shown in FIG. 1;

FIG. 23 is a fragmentary cross-sectional view along the line 23—23 of FIG. 19;

FIG. 24 is a fragmentary cross-sectional view along the line 24—24 of FIG. 22;

FIG. 25 is an elevational view of the head end cover plate of the beds shown in FIGS. 1 and 13;

FIG. 26 is a plan view of the cover plate shown in FIG. 25; and

FIG. 27 is an end elevational view partly in cross section of the cover plate fixed to the head end crossmember of the bedframe.

DESCRIPTION OF THE PREFERRED EMBODIMENT

Referring now to the drawings in more detail and as will be seen best in FIGS. 1 and 2, by way of example, the present invention is applied to a hospital bed of the type shown in Hillenbrand et al. U.S. Pat. No. 3,237,212 issued Mar. 1, 1966, which bed is equipped with control unit of the type shown in the Burst et al. U.S. Pat. No. 3,198,891, issued Aug. 3, 1965. It is sufficient to note here that this bed has a lower frame 10 that is supported upon the floor, a retract frame 11 supported upon frame 10 for translatory movement longitudinally of the bed, a mattress supporting frame indicated, generally, at 12 and consisting of a seat section 13 that is fixed upon the frame 11, a head section 14, a thigh section 15 and a foot section 16. The bed is equipped with a motor 17, gearbox 18 and a control unit 19.

As will be seen best in FIG. 3 the motor 17 contains a mounting hub 20 which contains a groove into which a mounting bracket 21 extends. Bracket 21 contains a flange 22. A cross channel 23 fixed to and extending between the side rails of the bottom frame 10 carries a high dielectric strength plastic mounting block 24, best seen in FIG. 4, that contains an upwardly opening groove 25 into which the flange 22 of the mounting bracket 21 is positioned. Preferably the groove 25 is slightly shallower than the thickness of the flange 22.

A cap plate 26 also composed of a high dielectric strength plastic overlies the flange 22 and the assembly is held together by bolts 27 that project through perforations in the mounting block and cap plate and cross channel 23 to clamp the mounting bracket to the bed frame. A resilient block 28, bonded to the bracket 21, engages to casing of motor 17 to dampen any vibrations that may occur. The usual clamp engaged in notches in the mounting bracket 21 and the groove in the mounting hub 20 has been omitted from the drawings to avoid an unnecessary complication thereof.

The gearbox 18 is supported upon the lower frame 10 of the bed by a pair of mounting members, best seen in FIGS. 3, 5 and 10, each consisting of a stud 30 embedded in and keyed to a cylinder 31 of high dielectric strength plastic which has a tongue 32 projecting from one end thereof. A metal mounting bracket 33 is fixed upon a cross channel 34 of the bedframe 10 and contains a perforation into which a bushing 35 is fitted. The tongue 32 projects into the bushing 35 to support the gearbox on the bed frame. Preferably the bushing 35 is composed of an elastomer such as neoprene which has a certain amount of resiliency to dampen out any vibrations that may occur in the operation of the motor. Two bushings, such as that shown in fig. 5, are provided thereby to support the motor, gearbox and control unit in the bedframe by a three point highly insulated suspension system.

As will be seen in the above-mentioned Hillenbrand patent, the gearbox of the bed contains two power output shafts each connected to a drivescrew on the bedframe. As will be seen in FIGS. 6 through 10, inclusive, each power shaft 37 is connected to the corresponding drive screw 38 by a coupler consisting of a metallic screw collar 39 fixed upon the end of the screw shaft by suitable means such as a drive pin. A power collar 40 contains a central opening having opposed flat sides which register with the opposed flat sides of the power output shaft 37. An elastomer coupling 41, preferably consisting of neoprene, is bonded to these two collars and extends therebetween. Neoprene is preferred at this point since it will tend to dampen any vibrations that may develop during operation of the motor of the bed.

If desired, the coupling shown in FIGS. 6-10 may be replaced with a cylinder of plastic containing in one end an opening shaped to receive the shaft 37 and containing an opening in the other end shaped to receive a screw 38 and to be keyed thereto by a suitable drive pin.

The bed contains patient control rods 42, one for each function to be operated by the motor. As will be seen in FIG. 3 a rod 42 is journaled in an upright frame member 43 and carries a crank arm 44 which is connected by a link 45 to an insulating crank 47 that projects from the control unit 19. Each control crank 47 consists of a body of high dielectric strength plastic containing a perforation 48 into which the link 45 projects. To guard against the possibility of the control links 45 coming into contact with the casing of control unit 19, a plate 50 composed of a dielectric such as nylon is attached to the end of the control unit and extends upwardly therefrom.

In the event that the attending physician desires to have the bed set in a particular position and maintained in that position, even though the patient may try to alter the position, suitable lockout means are provided. As will be seen in FIGS. 11 and 12 a lockout rod 51 is journaled in the side rail of the bottom frame 10 and a high dielectric strength lockout fork 52 is fixed to the inner end of this rod in suitable manner such as by a pin. Lockout fork extends upwardly and engages the lockout lever 53 in the control unit 19. Thus, when the physician desires to lock out a function of the bed, the control rod 51 is pulled outwardly thereby pulling outwardly the control lever 53 to lock out that particular function of the bed.

The beds to which the present invention are applied usually contain metallic covers attached to the foot end of the upper frame 11 and extending over the motor to the seat section 13, of the mattress supporting frame. The beds also contain a bottom cover attached to the lower side of the bottom frame 10 and also suitable metallic covers at the head end of both the upper and lower frames. To guard against the possibility of electricity being conducted from the motor to the frame of the bed, the foot end upper cover 55 which is attached to the upper frame 11 is lined by a high dielectric strength plastic plate 56, best seen in FIGS. 16, 17 and 18. The liner plate 56 is attached to the cover 55 by cement and by staples 57 which are located outside of the area likely to come into contact with the motor 17. The cover contains the openings 58 through which the operating mechanisms of the bed project.

As will be seen best in FIGS. 13 and 14, the bed shown in FIG. 13 is equipped with a bottom cover 60 fixed to the underside of the side rails of the frame 10 at the foot end thereof and with a head end cover 61. Covers 60 and 61 are composed of a high dielectric strength plastic and are attached to the side rails in a convenient manner such as by screws. The covers 60 and 61 are separated as best seen in FIG. 14.

As will be apparent from U.S. Pat. No. 3,237,212, the nuts on the power screws of the bed rest upon channels disposed beneath the screws. To guard against the possibility of lubricant escaping from the bed, a drip pan 62 composed of metal is attached to the screw channels 63 and located therebeneath. The pan 62 is equipped with an absorbent liner 64 which retains any lubricant that may drop off of the screws. The liner is cemented in the cover.

Use of the upper insulated metal cover 55 and the bottom covers 60, 61 and 62 is simple and advantageous from a cost standpoint. In certain instances other covers may be used.

As will be seen in FIGS. 1, 2, 19, 20 and 21 a high dielectric strength plastic cover 70 may be used in lieu of the insulated metal cover 55. Cover 70 is reinforced by ribs 71 and contains openings 72 through which the operating mechanisms of the bed are extended.

As will be seen in FIGS. 1, 22, 23 and 24 a one piece high dielectric strength plastic cover 75 may be attached to the bottoms of side rails of frame 10. Cover 75 extends from end to end of frame 10 and includes ribs 76 and is shaped to provide clearance for mechanisms that may project below the frame 10 as indicated at 77.

As will be seen in FIGS. 25, 26 and 27, the cross channel 80 at the head end of the lower frame 10 of the bed is closed by a high dielectric strength plastic member 81 which is attached to the channel and carries hooks 82 around which the cord 83 connecting the motor of the bed to a source of electrical power is wound to keep it in a neat position and off of the floor of the room.

It has been found that when the bed is connected to a source of power with a safety plug 84 of the type in the Adams et al. application Ser. No. 849,102, filed Aug. 11, 1969, with the surplus cord wrapped around the hooks 82 and extended therefrom along the lower surface of the bottom cover 61 through an opening therein to the motor 17, no appreciable leakage to the frame of the bed can be detected even though the leakage from the cord is as high as one microampere per foot of cord. The cord 83 is drawn taut and secured to the cover 61 by a suitable clamp 85.

Tests show that with the plug 84 inserted in a properly grounded socket a microammeter connected between the frame of the bed and ground shows a leakage of less than one microampere. With the plug inserted in an ungrounded socket the microammeter shows a leakage of less than 5 microamperes.

There are available upon the open market a number of plastics that are rated as high dielectric strength. Among these are polycarbonates available under tradenames Lexan and Merlon, also polyamide available as Nylon. These plastics have been found to be satisfactory for use in the present invention.

Thus it will be seen that the double-insulated bed of the present invention reduces greatly the chance of a patient in the bed being electrocuted by means of the bed being the source of current for the electrocution. Should the patient touch the bedframe or the metallic safety sides attached thereto, the maximum amount of current that can reach him is less than 1 microampere and the chances of that amount of current doing him any damage is very remote.

It will be readily apparent that the present invention provides a substantial step forward in the art of protecting the patient in an electric hospital bed from probable electrocution.

While we have chosen to show and describe an invention by applying it to a particular electric hospital bed, we have done so by way of example only as the teachings of the invention can be applied to other types of hospital beds by suitable modification and such application is contemplated.

We claim:
1. An electrically operable hospital bed comprising a lower frame for supporting said bed; a mattress-supporting frame supported by said lower frame and moveable between a plurality of body-supporting positions; at least one drivescrew supported by said lower frame and connected to said mattress-supporting frame to effect movement thereof; at least one patient control rod supported by said lower frame and moveable to effect selection of said plurality of body-supporting positions; a unitary power drive and control means connected to and supported by said lower frame including an electric motor, a gearbox secured to said electric motor having at least one output shaft drivingly connected to said drivescrew, said gearbox providing selective driving engagement between said motor and drivescrew, and a control unit operable to control operation of said gearbox; and means completely electrically isolating said unitary power drive and control means from said bed-comprising mounting means formed of high dielectric strength material interposed between said unitary power drive and control means and said lower frame, coupling means formed of high dielectric strength material connecting said output shaft of said gearbox and said drivescrew, and connecting means formed of high dielectric strength material connected between said patient control rod and said control unit.

2. An electrically operable hospital bed as claimed in claim 12 wherein said mounting means formed of high dielectric strength material interposed between said unitary power drive and control means and said lower frame includes a block of high dielectric strength material supported by said lower frame and having slot formed therein receiving a motor-mounting bracket connected to said motor, and a cap plate formed of high dielectric strength material secured to said block and overlying said portion of said bracket within said slot, and wherein said mounting means further includes a pair of stud screws fixed to said gearbox each supporting a cylinder formed of high dielectric strength material, a pair of brackets secured to said lower frame each supporting an elastomeric dielectric bushing, said bushing supportingly engaging said cylinders.

3. An electrically operable hospital bed as claimed in claim 1 wherein said means completely electrically isolating said unitary power drive and control means includes a cover member formed of high dielectric strength material overlying said unitary power drive and control means intermediate said means and said mattress supporting frame.

4. An electrically operable hospital bed as claimed in claim 1 wherein said motor includes a power cord for connection to a source of electrical power and said means completely electrically isolating said unitary power drive and control means includes supporting means supporting the power cord of said motor upon said lower frame of said bed, said supporting means being formed of high dielectric strength material.

* * * * *